June 30, 1925.

H. T. THOMAS

SLEEVE FOR BEARINGS

Filed Nov. 4, 1921

1,543,959

INVENTOR.

Horace T. Thomas

BY Rolgemond A. Parker

ATTORNEY.

Patented June 30, 1925.

1,543,959

UNITED STATES PATENT OFFICE.

HORACE T. THOMAS, OF LANSING, MICHIGAN.

SLEEVE FOR BEARINGS.

Application filed November 4, 1921. Serial No. 512,716.

*To all whom it may concern:*

Be it known that I, HORACE T. THOMAS, a citizen of the United States, residing at Lansing, county of Ingham, State of Michigan, have invented a certain new and useful Improvement in Sleeves for Bearings, and declare the following to be a full, clear, and exact description of the same, such as will enable others skilled in the art to which it pertains to make and use the same, reference being had to the accompanying drawings, which form a part of this specification.

My invention relates to sleeve bearing surfaces and an object of my improvements is to provide such a sleeve that shall fit closely to its adjusted position and be immovably held in place.

In the accompanying drawing, I have shown my invention as applied to an automobile axle.

$a$ indicates the axle of an automobile having the cylindrical part $a^2$, the conical part $a^3$ and the screw-threaded portion $a^4$ in the order named. $b$ is a nut on the screw-threaded portion $a^4$. $c$ is the wheel hub which is fitted to the conical part $a^3$ of the axle and secured thereto by a key $c^2$, the end of said key extends a short distance beyond the inner end of the hub $c$, for the purposes hereinafter described.

$d$ is a bearing sleeve fitted upon the cylindrical portion $a^2$ of the axle $a$. The outer end of this sleeve is cut away at $d^2$ along its inner surface and slightly within the outer end of said sleeve. The extended cylindrical inner surface $d^6$ of the sleeve $d$ fits upon the cylindrical surface $a^2$ of the axle $a$. At the outer end of the sleeve $d$, the edge extends inward at $d^3$ a short distance so that the diameter of the sleeve at this point is less than in the main portion $d^6$. The inner surface of the sleeve at $d^3$ is made slightly conical to fit against the conical surface $a^3$ of the axle $a$. In the outer end of the sleeve $d$ are formed three radial slots $d^4$ extending inward to the cylinder $d^6$ and past the cut-away portion $d^2$. The outer end of said sleeve is also provided with a slot $d^5$.

Figure 1:
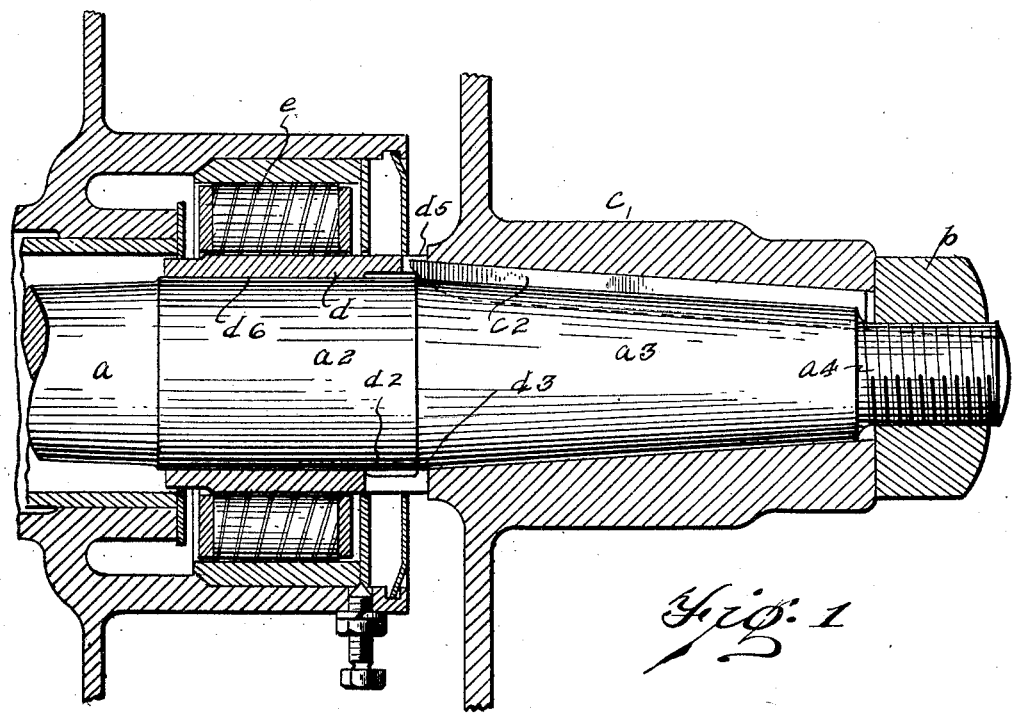
Figure 1 is a sectional elevation of one end of an automobile axle with adjacent parts shown in section.
Figure 2:
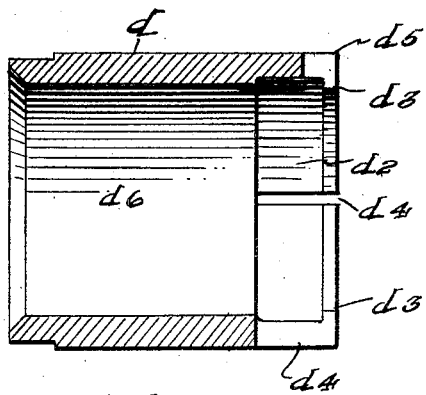
Fig. 2 is a section of the sleeve separate from the axle.
Figure 3:
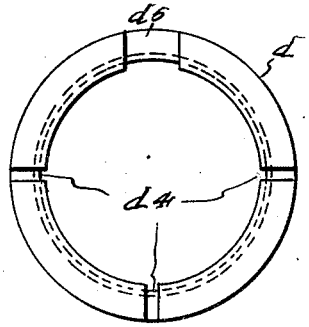
Fig. 3 is an end view of the sleeve looking from the right of Fig. 2.

The parts are assembled as follows:

The sleeve $d$ is placed upon the cylindrical portion $a^2$ of the axle $a$, its surface $d^6$ engaging against the cylindrical surface $a^2$ of said axle and its surface $d^3$ extending over and engaging against the surface of the conical portion $a^3$ of the axle, as shown in Fig. 1. The hub $c$ of the wheel is then placed in position upon the conical portion $a^3$ of the axle, the key $c^2$ engaging said hub and axle and extending beyond the end of said hub, its end engaging in the slot $d^5$; the nut $b$ is then adjusted to place and screwed up holding the hub $c$ securely in position, the inner end of the hub engaging the outer end of the sleeve $d$. When the nut $b$ is screwed up it will press the sleeve $d$ inward. The slots $d^4$ $d^5$ permit the outer end of said sleeve to expand as it is forced along the conical portion $a^3$ of the shaft by the hub $c$ forced inward by said nut. Thus a tight and close engagement between the sleeve and the axle is secured.

The engagement of the key $c^2$ in the slot $d^5$ will hold the sleeve $d$ from rotation.

What I claim is:

1. The combination of an axle having the cylindrical portion $a^2$ and the conical portion $a^3$ coaxial with each other, and a sleeve adapted to fit upon said cylindrical portion of the axle and having an end of lesser diameter adapted to engage upon the conical portion of said axle whereby said sleeve is positioned by the co-action of its smaller end and the conical portion of the axle.

2. The combination of an axle having the cylindrical portion $a^2$ and the conical portion $a^3$, coaxial with each other, and a sleeve adapted to fit upon said cylindrical portion of the axle and having an end of lesser diameter adapted to engage upon the conical portion of said axle, the end of said sleeve adjacent to the conical portion of said axle being constructed to afford elasticity in a radial direction whereby said sleeve is positioned by the co-action of its smaller end and the conical portion of the axle.

3. The combination of an axle having the cylindrical portion $a^2$ and the conical portion $a^3$, and a sleeve adapted to fit upon said cylindrical portion of the axle and having an end of lesser diameter adapted to engage upon the conical portion of said axle, the end of said sleeve adjacent to the conical portion of said axle being constructed to afford elasticity in a radial direction, and means for forcing said sleeve along said conical portion of the axle toward the larger end of said conical portion.

4. The combination of an axle having the cylindrical portion $a^2$ and the conical portion $a^3$, and a sleeve adapted to fit upon said cylindrical portion of the axle and having an end of lesser diameter adapted to engage upon the conical portion of said axle, the end of said sleeve adjacent to the conical portion of said axle being constructed to afford elasticity in a radial direction, a wheel hub engaging upon said conical portion of the axle having its inner end engaging the outer end of said sleeve, and means for securing said hub in position and forcing it inward for the purpose described.

5. The combination of an axle having the cylindrical portion $a^2$ and the conical portion $a^3$, and a sleeve adapted to fit upon said cylindrical portion of the axle and having an end of lesser diameter adapted to engage upon the conical portion of said axle, the outer end of said sleeve being provided with a radial slot, a wheel engaging upon said axle outside of said sleeve, a key engaging said wheel and axle, its end extending into said slot.

6. The combination of an axle having the cylindrical portion, $a^2$, and the conical portion, $a^3$, coaxial with each other, and a sleeve adapted to fit upon said cylindrical portion of the axle, and having an end of lesser diameter adapted to engage upon the conical portion of said axle, the end of said sleeve adjacent to the conical portion of said axle being provided with a plurality of radial slots.

In testimony whereof, I sign this specification.

HORACE T. THOMAS.